United States Patent
Kadota

(10) Patent No.: US 7,969,611 B2
(45) Date of Patent: Jun. 28, 2011

(54) DISPLAY SYSTEM AND METHOD OF CONTROLLING SAME

(75) Inventor: Shigehiro Kadota, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1093 days.

(21) Appl. No.: 11/467,274

(22) Filed: Aug. 25, 2006

(65) Prior Publication Data

US 2007/0046657 A1    Mar. 1, 2007

(30) Foreign Application Priority Data

Sep. 1, 2005 (JP) ................................ 2005-253797
Aug. 1, 2006 (JP) ................................ 2006-210254

(51) Int. Cl.
*G06F 15/00* (2006.01)
*G06F 3/12* (2006.01)
*G06F 3/00* (2006.01)

(52) U.S. Cl. ....... 358/1.9; 358/1.14; 358/1.15; 715/753; 715/730; 715/731; 715/732; 715/255

(58) Field of Classification Search ................ 358/1.15, 358/1.14, 1.9; 345/179, 182; 715/730, 732, 715/230, 231, 232, 233, 255, 731, 753; 726/26, 726/27, 2, 3, 16
See application file for complete search history.

(56) References Cited

U.S. PATENT DOCUMENTS

| | | | | |
|---|---|---|---|---|
| 5,235,681 A * | 8/1993 | Masuzaki et al. | ............. | 345/556 |
| 5,909,213 A * | 6/1999 | Martin | ............ | 715/753 |
| 5,920,694 A * | 7/1999 | Carleton et al. | ............. | 709/205 |
| 6,551,357 B1 * | 4/2003 | Madduri | ................... | 715/235 |
| 6,654,032 B1 * | 11/2003 | Zhu et al. | ..................... | 715/753 |
| 7,046,258 B1 * | 5/2006 | Naito et al. | .................. | 345/619 |
| 7,131,133 B1 * | 10/2006 | Kawakura et al. | ............... | 725/25 |
| 7,337,389 B1 * | 2/2008 | Woolf et al. | .................. | 715/230 |
| 7,353,252 B1 * | 4/2008 | Yang et al. | ..................... | 709/204 |
| 7,356,563 B1 * | 4/2008 | Leichtling et al. | ............ | 709/204 |
| 2002/0069365 A1 * | 6/2002 | Howard et al. | ............... | 713/201 |
| 2002/0099837 A1 * | 7/2002 | Oe et al. | ......................... | 709/229 |
| 2003/0009672 A1 * | 1/2003 | Goodman | ...................... | 713/176 |
| 2003/0164973 A1 * | 9/2003 | Hisatomi et al. | ............. | 358/1.15 |
| 2004/0064704 A1 * | 4/2004 | Rahman | ......................... | 713/182 |
| 2004/0230825 A1 * | 11/2004 | Shepherd et al. | ............. | 713/200 |
| 2006/0294237 A1 * | 12/2006 | Nguyen | ........................ | 709/225 |
| 2007/0061889 A1 * | 3/2007 | Sainaney | ......................... | 726/26 |
| 2009/0222673 A1 * | 9/2009 | Schneck et al. | ............... | 713/189 |

FOREIGN PATENT DOCUMENTS

JP    2003-44297    2/2003
JP    2003-316624   11/2003

* cited by examiner

*Primary Examiner* — King Y Poon
*Assistant Examiner* — Vincent R Peren
(74) *Attorney, Agent, or Firm* — Cowan, Liebowitz & Latman, P.C.

(57) ABSTRACT

A display system and display control method for displaying an image based upon image data supplied from an image supply device or external storage unit. Information indicating whether editing of image data is allowed or not is appended to an image, the information is discriminated and display areas of images corresponding to the image data are displayed on a screen upon making the display areas appear different from each other in accordance with the information discriminated.

7 Claims, 19 Drawing Sheets

F I G. 15
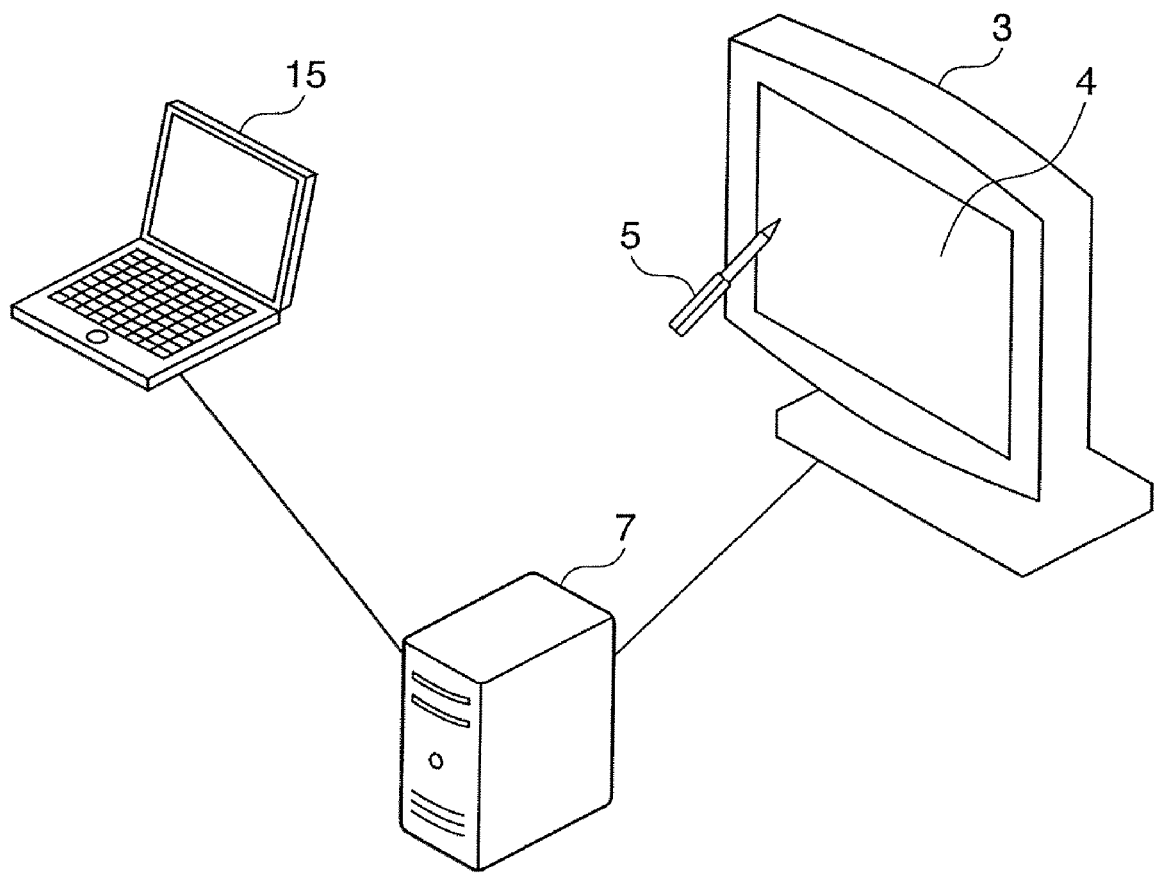

DISPLAY SYSTEM AND METHOD OF CONTROLLING SAME

BACKGROUND OF THE INVENTION

1. Field of the Invention

The present invention relates to a display system for displaying image data such as that representing a document, and to a method of controlling this system.

2. Description of the Related Art

Conference systems utilizing a large-screen display apparatus have become commercially available in recent years. With such a conference system, high-resolution materials for conferences and video images can be displayed by use of the large-screen display apparatus so as to be identifiable by those attending the conference. Also commercially available is a system in which a pointing device such as a digitizer is attached to a large-screen display device so that coordinates can be designated or graphics input by a pen or finger on the screen. In a conference system of this kind, materials are displayed on the display device and it is possible to add on annotations such as a legend by input using a pointing device such as an optical digitizer.

Such a conference system is so adapted that the materials used in the conference are stored in a server or the like and can be referred to later.

The specification of Japanese Patent Application Laid-Open No. 2003-316624 discloses that a database of a document management system for registering and managing documents has inhibiting means for adding on an identifier indicating that an editing-inhibited state is in effect.

Further, the specification of Japanese Patent Application Laid-Open No. 2003-044297 discloses the provision of means for registering whether or not copying is to be performed along with reference to a file and limiting reference and copying depending upon whether these are allowed or not.

The specification of Japanese Patent Application Laid-Open No. 2003-044297 further discloses the provision of means for restricting operation of resources, inclusive of files and computer resources other than a screen, with respect to a user not having access rights, and extending inhibited or restricted items in the existing environment.

There are instances where materials used at the site of the conference are merely shown at the conference but not distributed. Such materials are not saved as conference materials, and often the very fact that the materials were presented also does not remain in the minutes of the meeting.

However, the conventional systems described above are premised on management of already existing documents; they are not premised on management relating to editing of documents that have been read by a multifunction peripheral (MFP) or scanner.

In the above-described conference systems, it is assumed that a document read by a multifunction peripheral or scanner is displayed on a display apparatus. In this case a situation is conceivable in which whether or not a document displayed on the display apparatus is data for which editing is not wanted cannot be ascertained by the presenter who writes in the document using the display apparatus.

Further, in the above-described conference systems, it is assumed that a document or data file supplied will be displayed on the display apparatus in the conference room. In this case, access to a document or data file displayed on the display apparatus is determined solely by the right of the user who read the document of data file into the conference system. In such a conference system, therefore, a situation is conceivable in which whether the document or data file is data for which editing is not wanted cannot be ascertained.

Furthermore, in a case where capture of a screen is inhibited in a conventional system, the following three methods are conceivable:

1. inhibiting capture of an entire screen;
2. inhibiting capture of a window displaying a document; and
3. when there is a window that displays a document whose capture has been inhibited, inhibiting capture of the entire screen if full-screen capture is the specification of the system.

This system is such that if the window of a document whose capture has been inhibited is being displayed when screen capture is performed as a recording of the conference, then capture of the entire screen can no longer be performed.

SUMMARY OF THE INVENTION

An object of the present invention is to solve the aforementioned problems of the prior art.

According to the present invention, the foregoing object is attained by providing a display system in which it is possible to readily determine whether an image being displayed is capable of being edited or not, as well as a method of controlling this system.

According to the present invention, there is provided with a display system for displaying an image on a display device based upon image data supplied from an image supply device;

wherein the image supply device having a designation unit configured to accept a designation as to whether editing of image data, which has been obtained by reading an original, is allowed; and the display device having a display control unit configured to control editing of the image data in accordance with the designation accepted by the designation unit.

According to the present invention, there is provided with a display system for displaying an image or video on a display device based upon image data or video data supplied by transferring, via a network, a display screen of a personal computer connected on the network;

wherein the personal computer having a designation unit configured to accept a designation as to whether editing of image or video data appearing on its own screen is allowed; and the display device having a display control unit configured to control editing of an image or video data supplied by transferring the screen of the personal computer via the network in accordance with the designation accepted by the designation unit.

According to the present invention, there is provided with a display control method for displaying an image on a display device based upon image data supplied from an image supply device, the method comprising:

a designation step of accepting a designation as to whether editing of image data, which has been obtained by reading an original, is allowed; and a display control step of controlling editing of the image data in accordance with the designation made at the designation step.

Further features of the present invention will become apparent from the following description of exemplary embodiments with reference to attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 15 depicts a view schematically illustrating another configuration of a display system according to the fourth embodiment;

DESCRIPTION OF THE EMBODIMENTS

Preferred embodiments of the present invention will be described in detail with reference to the accompanying drawings. It should be noted that the embodiments below do not limit the present invention set forth in the claims and that all combinations of features described in the embodiments are not necessarily essential as means for attaining the objects of the invention.

First Embodiment

Figure 1:
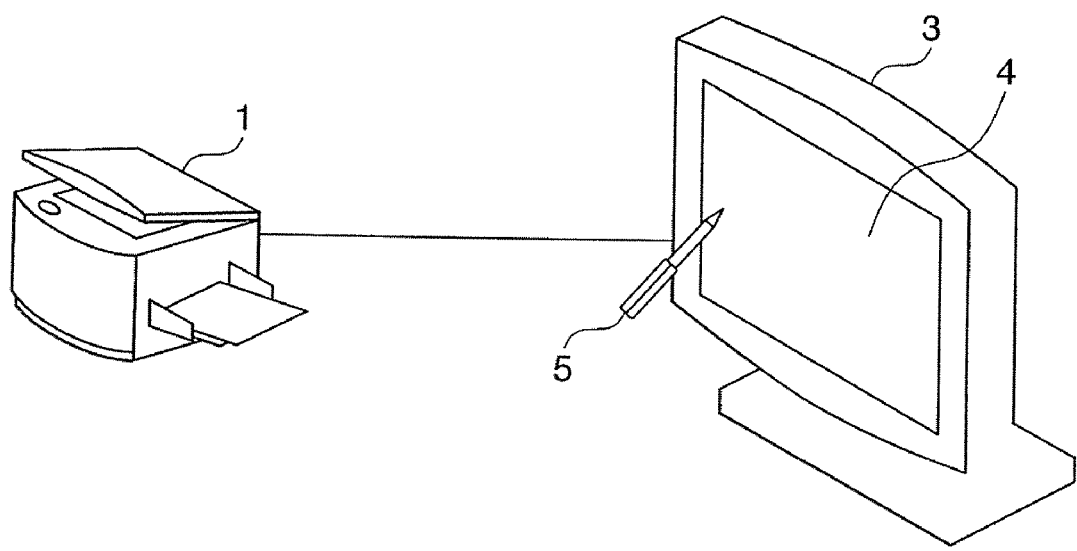
FIG. 1 depicts a view schematically illustrating the configuration of a display system according to a first embodiment of the present invention.

FIG. 1 depicts a view schematically illustrating the configuration of a display system according to a first embodiment of the present invention.

A multifunction peripheral (MFP) 1 that functions as an image supply apparatus has an image reading function and a copying function for reading and copying documents and the like. The image of the document read by a scanner (reader) of the multifunction peripheral 1 is displayed on a large-screen display apparatus 3 via a cable such as a USB cable. The display apparatus 3 has a digitizer 4 for determining a position designated on a screen using an input pen 5 and outputting coordinate information of the position. The user is capable of designating a position on the screen of the display apparatus 3 by means of the input pen 5, and the display apparatus 3 is capable of entering coordinate information indicative of the position designated. As a result, an image capable of being edited can be annotated using an optical digitizer 4.

Figure 2:
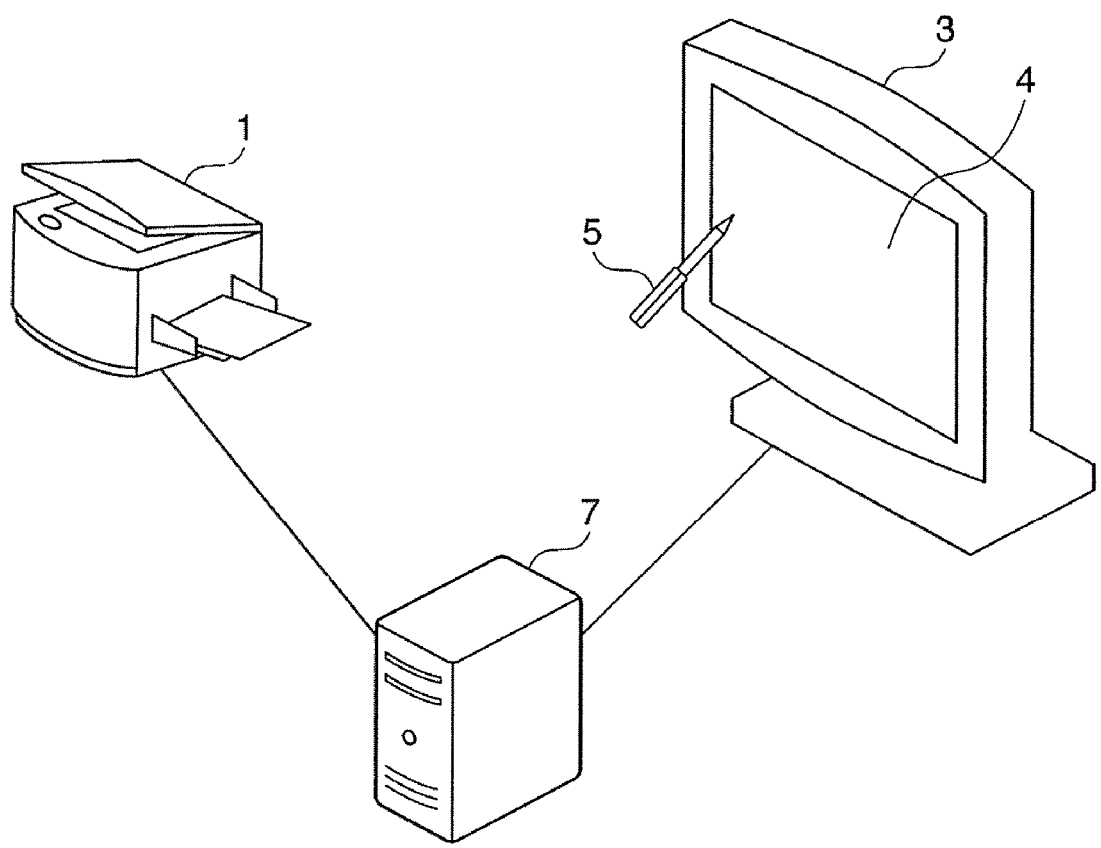
FIG. 2 depicts a view schematically illustrating another configuration of a display system according to the first embodiment.

FIG. 2 depicts a view schematically illustrating another configuration of a display system according to this embodiment. Here components similar to those in FIG. 1 are designated by like reference characters.

As shown in FIG. 2, the multifunction peripheral 1 and the display apparatus 3 are connected via a terminal apparatus 7. In accordance with this configuration, image data representing the document read by the scanner of the multifunction peripheral 1 is sent to and displayed on the display apparatus 3 via the terminal apparatus 7. If a position on the screen of the display apparatus 3 is designated by the optical digitizer 4, coordinate information indicative of the position designated is sent to and processed by the terminal apparatus 7. As a result, an image capable of being edited can be annotated using the input pen 5 in a manner similar to that of FIG. 1. In FIG. 1, the multifunction peripheral 1 or a display apparatus 3 has the function of the terminal apparatus 7.

Figure 3:
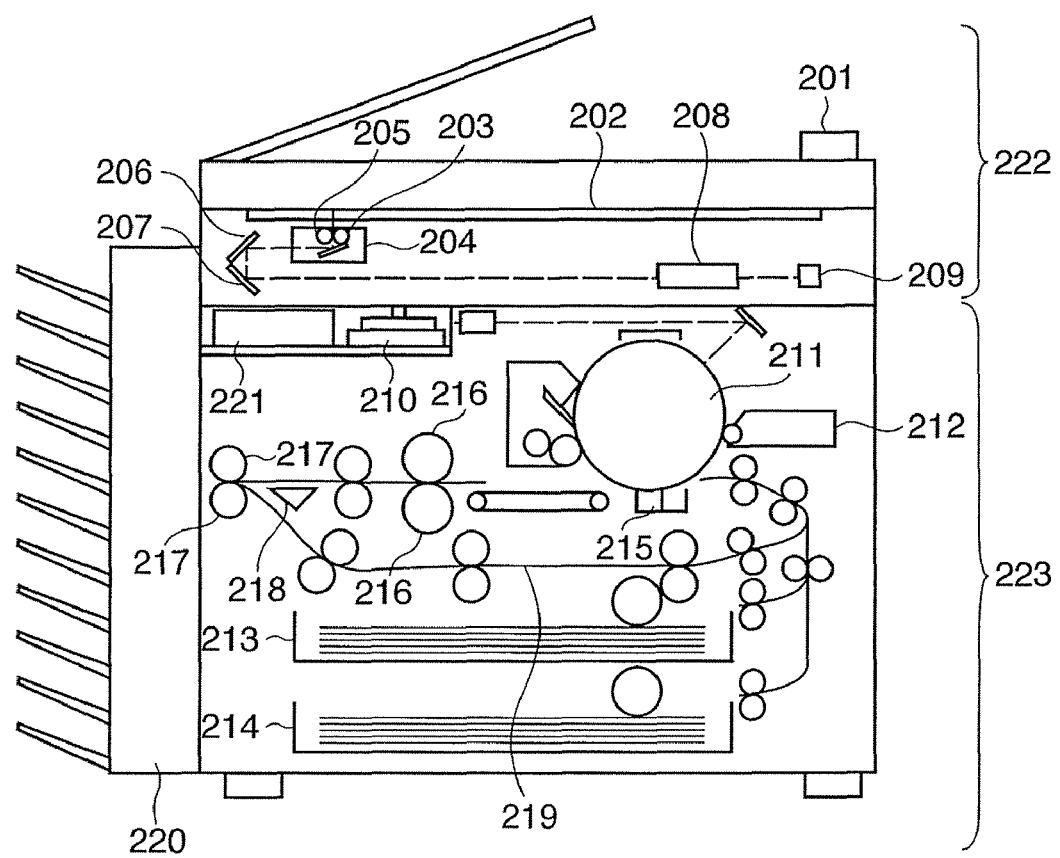
FIG. 3 depicts a structural sectional view useful in describing the structure of a multifunction peripheral contained in the display system according to the first embodiment.

FIG. 3 is a structural sectional view useful in describing the structure of the multifunction peripheral 1 contained in the display system according to the first embodiment.

As shown in FIG. 3, the multifunction peripheral 1 includes a reader unit 222 such as a scanner and an electrophotographic printer unit 223. A console unit 201 has a start button for starting copying or facsimile transmission, a numeric keypad for inputting telephone numbers and the like, and buttons for various operations. The console unit 201 has a display device for displaying messages to be read by the user, and buttons for designating whether a read image is to be made "FOR EDITING" or "FOR REFERENCE", as will be described later. A document placed on a platen glass 202 is illuminated with light from a light source 203, and reflected light from the document is guided to a CCD image sensor (CCD) 209 by mirrors 205, 206, 207 and a lens 208. A light-source unit 204 that includes the light source 203 and mirrors is moved in the sub-scan direction (to the right in FIG. 3) in sync with the optical scanning of the document. The light impinges upon and forms an image on the CCD 209, which converts the resultant light signal to an electric signal and outputs the electric signal to an image processor (not shown). The image processing subjects the electric signal to prescribed image processing and outputs the processed signal to the printer unit 223 as image data.

The printer unit 223 will be described next.

A laser driver 221 drives a laser emitter 210 in accordance with image data supplied from the reader unit 222. Laser light emitted from the laser emitter 210 is deflected in the main-scan direction by a polygon mirror and is scanned across a photosensitive drum 211. As a result, an electrostatic latent image conforming to the laser light is formed on the photosensitive drum 211. A developing agent (toner) supplied from a developer 212 affixes itself to the latent-image portion on the photosensitive drum 211 and is developed.

At a timing synchronized to the start of the laser light emission, printing paper is fed from a cassette 213 or 214 and transported to a transfer unit 215. Here the toner affixed to the photosensitive drum 211 is transferred to the transported printing paper. The printing paper to which the toner has thus been transferred is transported to a fixing unit 216. The toner is transferred to the printing paper by the heat and pressure of the fixing unit 216. The printing paper that has thus passed through the fixing unit 216 is discharged from the apparatus by discharge rollers 217. A sorter 220 sorts the printing paper by placing the printing paper thus discharged in respective ones of bits. In a case where the sorter 220 has not been set to sorting, the printing paper is accommodated in the uppermost bin.

If double-sided printing has been set, then, after the printing paper has been transported to the position of the discharge rollers 217, the discharge rollers 217 are rotated in reverse and the printing paper is guided to a re-feed path 219 by a flapper 218. Further, if multiple printing has been set, the printing paper is guided to the re-feed path 219 by the flapper 218 in such a manner that the paper is not transported to the discharge rollers 217. The printing paper thus guided to the re-feed path 219 is fed to the transfer unit 215 at the above-mentioned timing.

Figure 4:
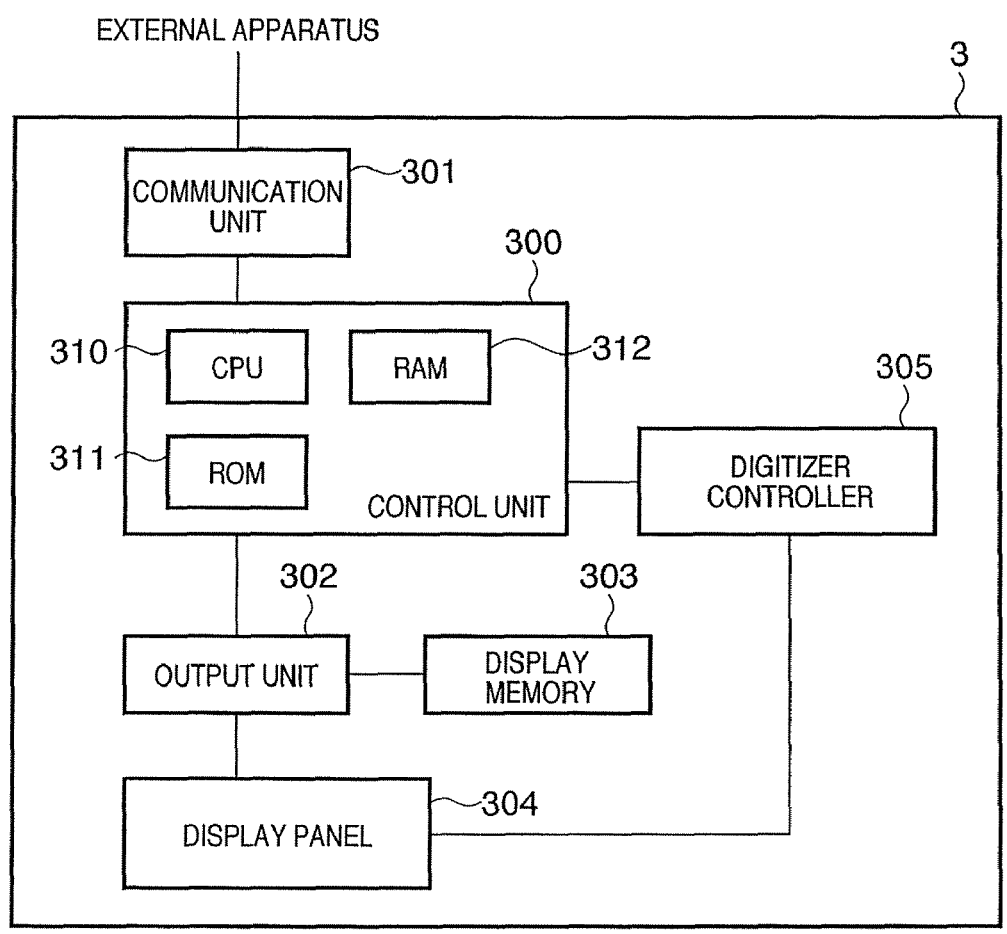
FIG. 4 is a block diagram illustrating the structure of a display device according to the embodiment.

FIG. 4 is a block diagram illustrating the structure of the display apparatus 3 according to this embodiment. The diagram of the structure of the display apparatus 3 in FIG. 4 assumes the system configuration of FIG. 1.

A control unit 300 in FIG. 4 controls the overall operation of the display apparatus 3. A communication unit 301 exchanges data with the multifunction peripheral 1. An output unit 302 develops display data in a display memory 303 in accordance with a display command from the control unit 300 and controls a display panel 304. The latter is a large-screen display panel and may be a liquid crystal display or projector, etc. A digitizer controller 305 detects a position, which has been designated by the input pen 5, on the display panel 304 using the optical digitizer 4 and notifies the control unit 300 of the position detected.

The control unit 300 has a CPU 310 such as a microprocessor, a ROM 311 for storing a program executed by the CPU 310, and a RAM 312, which is used as a work area when processing is executed by the CPU 310, for storing various data temporarily.

Figure 5:
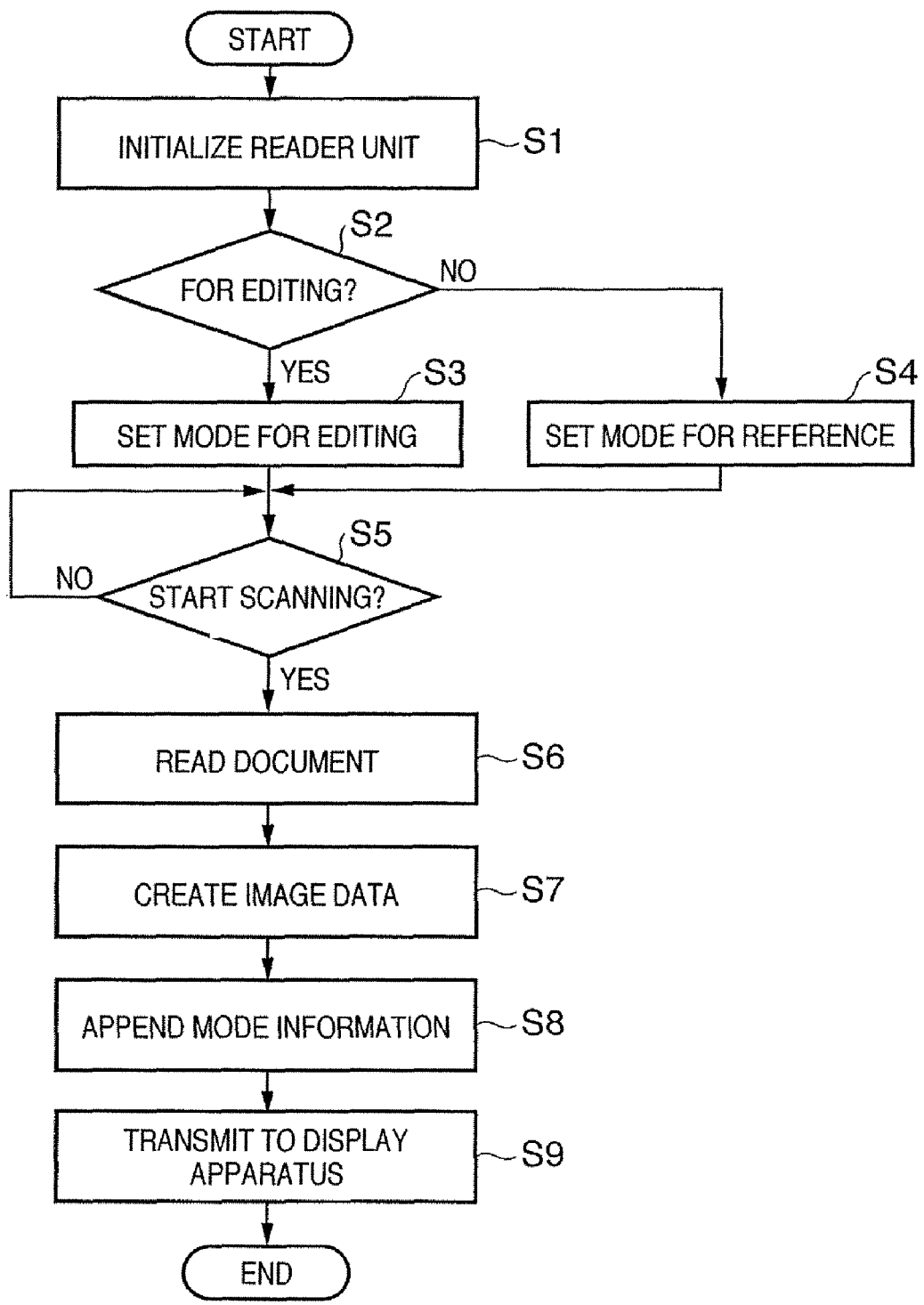
FIG. 5 is a flowchart useful in describing processing in a case where an original is read by the reader unit of the multifunction peripheral according to the first embodiment.

FIG. 5 is a flowchart useful in describing processing in a case where an original is read by the reader unit 222 of the multifunction peripheral 1 according to this embodiment.

First, at step S1 in FIG. 5, processing for initializing the reader unit 222 of the multifunction peripheral 1 is executed. Here initialization processing known heretofore is executed and a selection button for selecting "FOR REFERENCE" and "FOR EDITING" are displayed on the display device of the console unit 201 of reader unit 222. The selection button is a software button for selecting whether to establish an edit mode that allows image data representing a document to be read to be subjected to editing such as addition or deletion, or a reference mode that does not allow the image data of the document to be subjected to editing such as addition or deletion. The selection button may be buttons selectable with regard to respective ones of the edit and reference modes, or a button for alternatively changing over the mode whenever the button is clicked.

Next, at step S2, an input from the mode selection button when a display is presented on the display apparatus 3 is accepted and control proceeds to step S3 if the edit mode has been specified. The edit mode is set and is stored in a memory (not shown) of the multifunction peripheral 1 at step S3. Control then proceeds to step S5. If the reference mode (not editing mode) is specified, on the other hand, control proceeds to step S4. Here the reference mode is set and is stored in the memory (not shown) of the multifunction peripheral 1. Control then proceeds to step S5. Here an input from a document-read start button (not shown) on the console unit 201 is accepted. If start of scanning is specified, scanning of the document is started and the document is read by the reader unit 222. Image data for display is created at step S7 based upon the data read. Next, at step S8, mode information indicating the operating mode set at step S3 or S4 is appended to the image data created at step S7. Then, at step S9, the image data to which the mode information has been appended is transmitted to the display apparatus 3.

Figure 6:
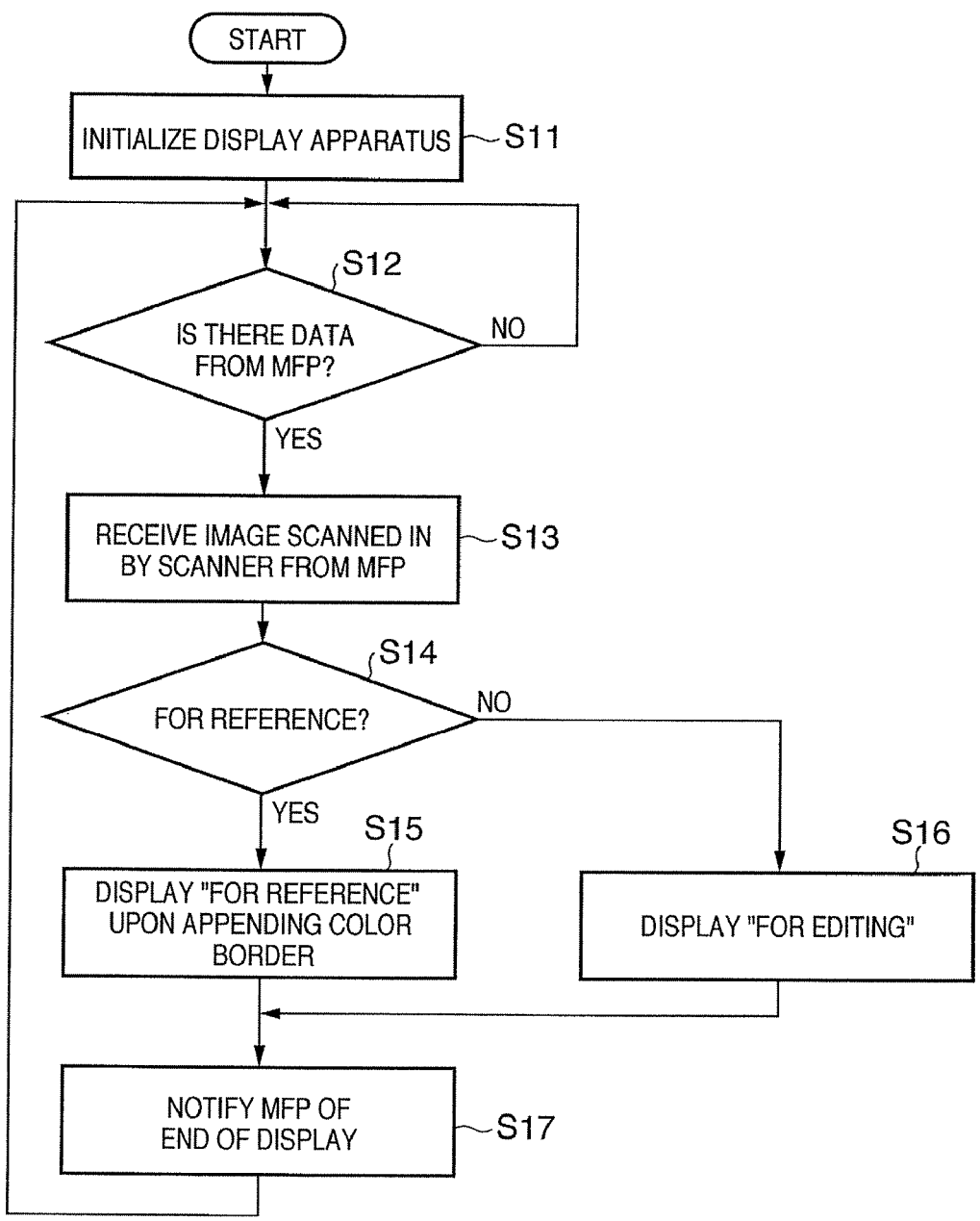
FIG. 6 is a flowchart useful in describing processing in a display apparatus according to the first embodiment.

FIG. 6 is a flowchart useful in describing processing in the display apparatus 3 according to this embodiment. This flowchart illustrates the processing for transmission and display, on the display apparatus 3, of image data to which has been appended the mode information, indicative of the reference mode or edit mode, transferred from the multifunction peripheral 1. The program for executing this processing has been stored in the ROM 311 and is executed under the control of the CPU 310.

First, initialization of the display apparatus 3 is performed at step S11. Here initialization processing known heretofore is executed and preparations are made for receiving image data from the multifunction peripheral 1. Next, at step S12, transmission of image data from the multifunction peripheral 1 is awaited and control proceeds to step S13 when image data is transmitted. The image data from the multifunction peripheral 1 is received at step S13. Next, at step S14, it is determined whether the mode information that has been appended to the received image data is indicative of the reference mode or edit mode. If the mode is the reference mode, control proceeds to step S15. Here the image is displayed upon the addition of a color different from that "FOR EDITING" to a title bar in an area that displays the image, as indicated by window 72 in FIG. 7, so as to make "FOR REFERENCE" identifiable.

Figure 7:
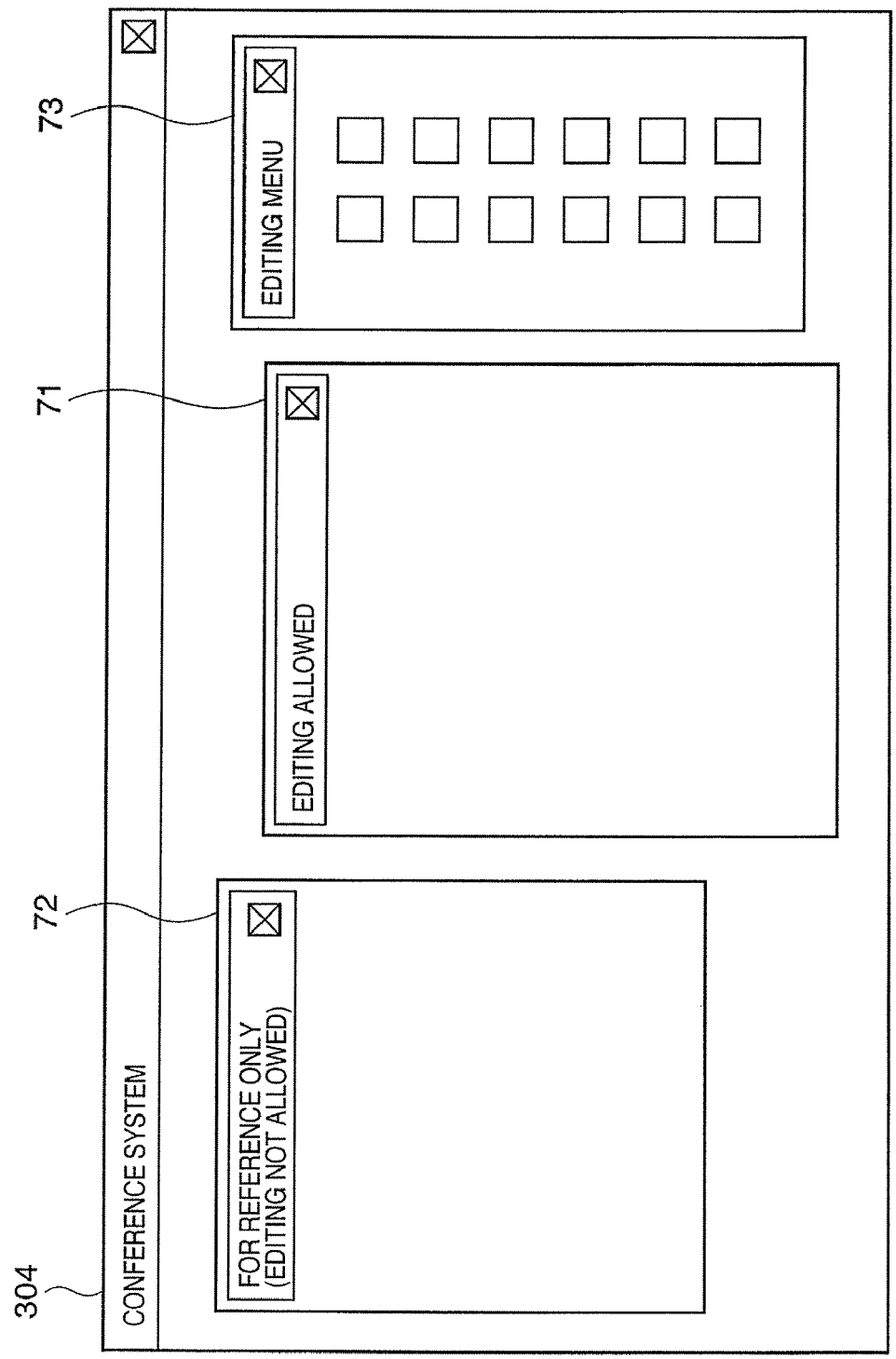
FIG. 7 depicts a view illustrating an example of a display screen of a display apparatus according to first to fifth embodiments of the present invention.

FIG. 7 depicts a view illustrating an example of a display screen of the display apparatus 3 according to this embodiment.

As shown in FIG. 7, a display area 71 indicates an area that displays an image in the edit mode. A display area 72 indicates an area that displays an image in the reference mode. An editing menu window 73 displays an editing menu for when an image is edited.

Image data displayed in the display area 72 that displays an image in the reference mode is inhibited from undergoing editing such as annotation. When the display area 72 has been activated, the display area 71 and the editing menu window 73 are deactivated and all editing items become incapable of being selected. Further, storage of the image as conference materials also is inhibited. Conversely, editing such as annotation is capable of being applied to image data displayed in the display area 71 that displays an image in the edit mode.

When the display area 71 has been activated, the editing menu window 73 is activated an all editing items become selectable.

This is followed by step S17, at which end of display of the image data is reported to the multifunction peripheral 1. Control then returns to step S12 and the above-described processing is executed.

If it is determined at step S14 that the received image data is of the edit mode, then control proceeds to step S16, where the image data is displayed in the display area 71 shown in FIG. 7. Control then proceeds to step S17, at which end of display of the image data is reported to the multifunction peripheral 1. Control then returns to step S12 and the above-described processing is executed.

Thus, at the moment a document is read by the reader unit 222 of the multifunction peripheral 1, "FOR REFERENCE" or "FOR EDITING" is specified. Mode information indicative of either "FOR REFERENCE" or "FOR EDITING" is then appended to the image data obtained by being read subsequently, and this image data is transferred to the display apparatus 3. As a result, if it is desired only to present a display on the display apparatus 3, the reference mode is established and editing of this image data can be inhibited. This means that there is no longer danger of the presenter editing this image data mistakenly. Further, it can be so arranged that a document or the like desired only to be presented to the conferees and not desired to be left as conference materials will only be displayed on the display apparatus 3 and not printed.

In accordance with the first embodiment, as described above, whether or not image data is supplied upon being placed in editable form can be specified at the supply source (the multifunction peripheral 1 in this embodiment) of the image data, and this image data can be supplied to the display apparatus. The display apparatus that has received this image data displays editable image data and image data that is not editable in respective ones of display areas, thereby making it possible to readily discriminate editable image data and image data that is not editable.

Second Embodiment

A second embodiment of the present invention will now be described. The hardware structures of the display apparatus 3 and terminal apparatus 7 of the display system according to the second embodiment are identical with those of the first embodiment and need not be described again.

Figure 8:
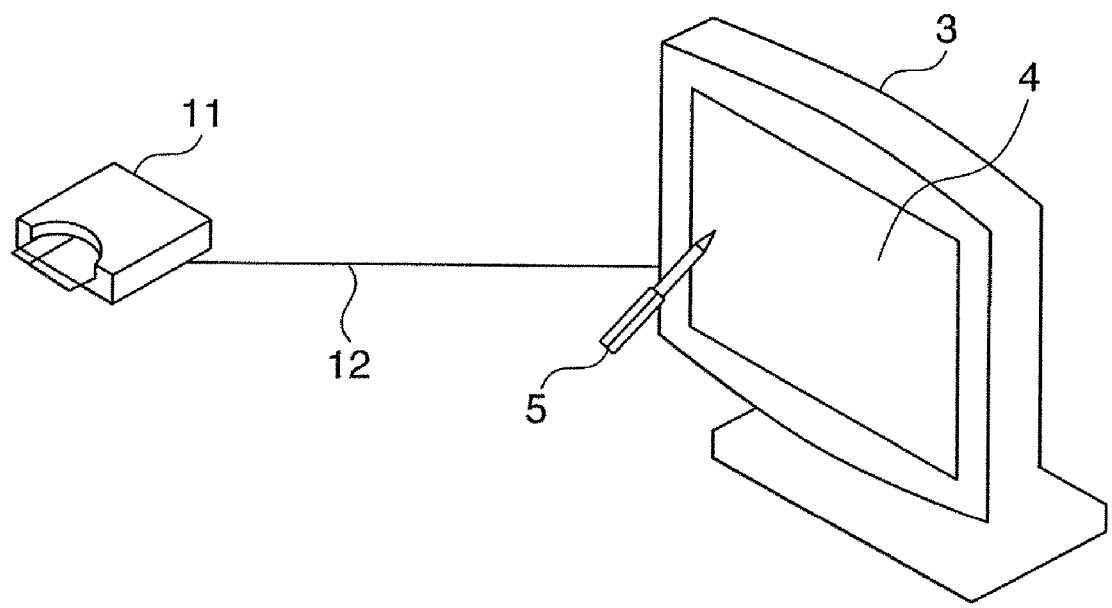
FIG. 8 depicts a view schematically illustrating the configuration of a display system according to the second embodiment.

FIG. 8 depicts a view schematically illustrating the configuration of a display system according to a second embodiment of the present invention.

An external storage unit 11 has a file writing function for writing documents and data files, etc., used in a conference. A document or data file that has been read in by the external storage unit 11 is sent to and displayed on the large-screen display apparatus 3 via a cable 12 such as a USB cable. The user is capable of designating a position on the screen of the display apparatus 3 by means of the input pen 5. As a result, a document or data file capable of being edited can be annotated using the optical digitizer 4.

Figure 9:
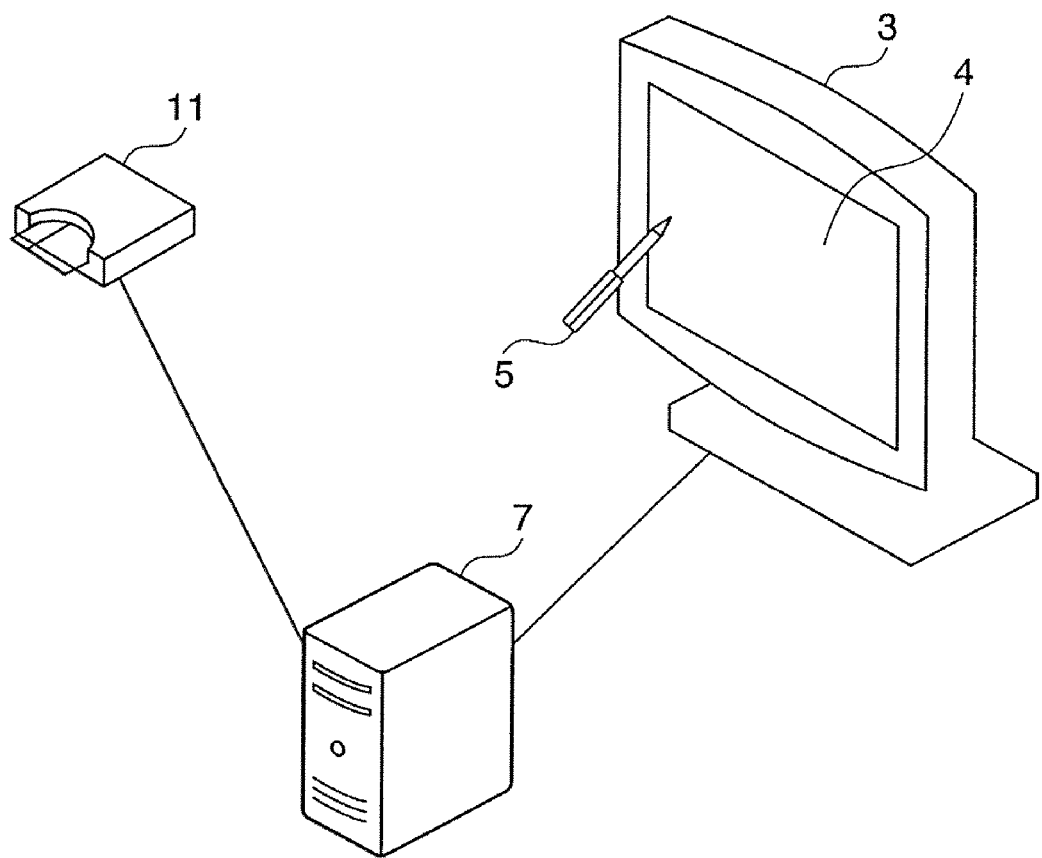
FIG. 9 depicts a view schematically illustrating another configuration of a display system according to the second embodiment.

FIG. 9 depicts a view schematically illustrating another configuration of a display system according to the second embodiment. Here components similar to those in FIGS. 2 and 8 are designated by like reference characters.

As shown in FIG. 9, the external storage unit 11 and the display apparatus 3 are connected via the terminal apparatus 7. In accordance with this configuration, a document or data file that has been read in by the external storage unit 11 is sent to and displayed on the display apparatus 3 via the terminal apparatus 7. If a position on the screen of the display apparatus 3 is designated by the optical digitizer 4, coordinate information indicative of the position designated is sent to and processed by the terminal apparatus 7. As a result, a document or data file capable of being edited can be annotated using the input pen 5 in a manner similar to that of FIG. 8.

Figure 10:
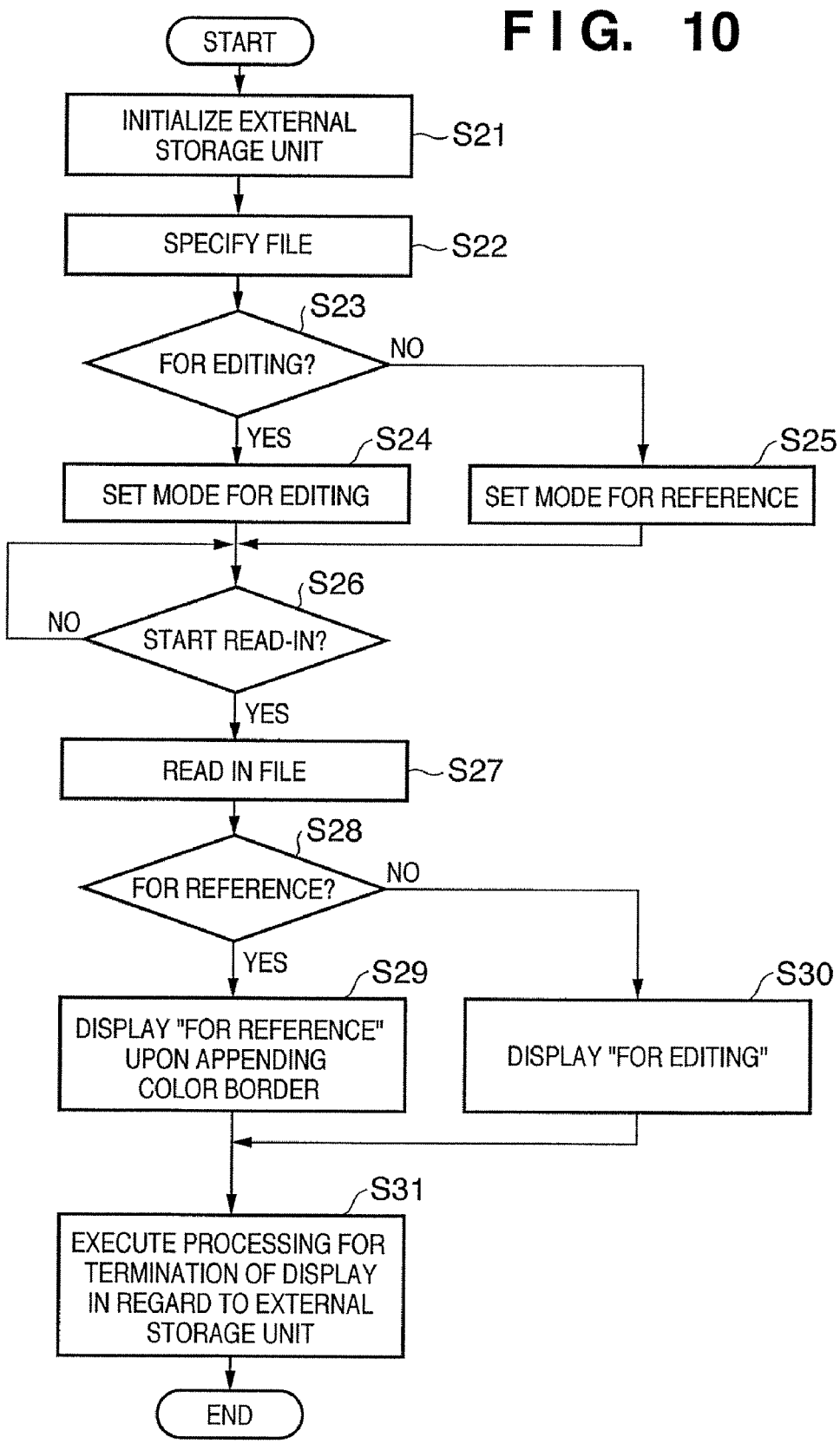
FIG. 10 is a flowchart useful in describing processing in a case where a document or file is read in from an external storage unit in the display apparatus according to the second embodiment.

FIG. 10 is a flowchart useful in describing processing in a case where a document or data file is read in from the external storage unit 11 in the display apparatus 3 according to the second embodiment. The program for executing this processing has been stored in the ROM 311 and is executed under the control of the CPU 310.

First, initialization of the external storage unit 11 is performed at step S21. Here initialization processing known heretofore is executed and a list of files in the external storage unit 11 as well as a button for selecting "FOR REFERENCE" and "FOR EDITING" are displayed on the screen of the display apparatus 3. The selection button is a software button for selecting whether to establish the edit mode or the reference mode with regard to a document or data file that will be read in. The edit mode allows the document or file to be subjected to editing such as addition or deletion. In the reference mode, editing such as addition or deletion is inhibited from being applied to the document or file. The selection button may be buttons selectable with regard to respective ones of the edit and reference modes, or a button for alternatively changing over the mode whenever the button is clicked.

Next, at step S22, a file to be read in is selected on the list of files that are being displayed on the screen of the display apparatus 3 and that have been stored in the external storage unit 11.

Next, at step S23, an input from the mode selection button when a display is presented on the display apparatus 3 is accepted and control proceeds to step S24 if the edit mode has been specified. The edit mode is set and is stored in the RAM 312 of the display apparatus 3 at step S24. Control then proceeds to step S26. If the reference mode is specified, on the other hand, control proceeds to step S25. Here the reference mode is set and is stored in the RAM 312 of the display apparatus 3. Control then proceeds to step S26. Here an input from a file-read start button [a software button (not shown) being displayed on the screen] is accepted. If start of read-in is specified, control proceeds to step S27 and the file is read in from the external storage unit 11.

Next, at step S28, it is determined whether the mode information that has been appended to the file read in is indicative of the reference mode or edit mode. If the mode is the reference mode, control proceeds to step S29. Here the image is displayed upon the addition of a color different from that "FOR EDITING" to a title bar in an area that displays the image, as indicated by window 72 in FIG. 7, so as to make "FOR REFERENCE" identifiable.

The example of the display screen of the display apparatus 3 in the second embodiment is the same as that shown in FIG. 7. The arrangement of FIG. 7 is similar to that of the first embodiment and need not be described again.

Image data displayed in the display area 72 that displays an image in the reference mode is inhibited from undergoing editing such as annotation. When the display area 72 has been activated, the display area 71 and the editing menu window 73 are deactivated and all editing items become incapable of being selected. Further, storage of the image as conference materials also is inhibited. Conversely, editing such as annotation is capable of being applied to image data displayed in the display area 71 that displays an image in the edit mode.

When the display area 71 has been activated, the editing menu window 73 is activated and all editing items become selectable.

This is followed by step S31, at which end of display of the image data is reported to the external storage unit 11.

If it is determined at step S28 that the image data read in is of the edit mode, then control proceeds to step S30, where the image data is displayed in the display area 71 shown in FIG. 7. Control then proceeds to step S31, at which end of display of the data is reported to the external storage unit 11.

Thus, at the moment a document or data file is read in from the external storage unit 11, "FOR REFERENCE" or "FOR EDITING" is specified. Information indicative of either "FOR REFERENCE" or "FOR EDITING" is then appended to the document or data file obtained by being read in subsequently, and this document or data file is transferred to the display apparatus 3. As a result, editing of the document or data will no longer be performed by the presenter mistakenly. Further, it can be so arranged that a document or the like desired only to be presented to the conferees and not desired to be left as conference materials will only be displayed on the display apparatus 3 and not printed.

In accordance with the second embodiment, as described above, when a document or file is read in from an external storage unit, whether or not the document or file is to be read in upon being placed in editable form can be specified. The display apparatus that has read in this document or file set in this manner displays editable data and data that is not editable in respective ones of display areas, thereby making it possible to readily discriminate editable data and data that is not editable.

Examples of the external storage unit 11 in the second embodiment are a Floppy (registered trademark) disk, hard disk, magneto-optical disk, CD-ROM, CD-R, CD-RW, DVD-ROM, DVD-RAM, DVD-R, DVD+R, DVD-RW, DVD+RW, HD-DVD, Blu-ray Disc, magnetic tape, non-volatile memory card and ROM, etc.

Third Embodiment

A third embodiment of the present invention will now be described. The hardware structures of the display apparatus 3 and terminal apparatus 7 of the display system according to the third embodiment are identical with those of the first embodiment and need not be described again.

Figure 11:
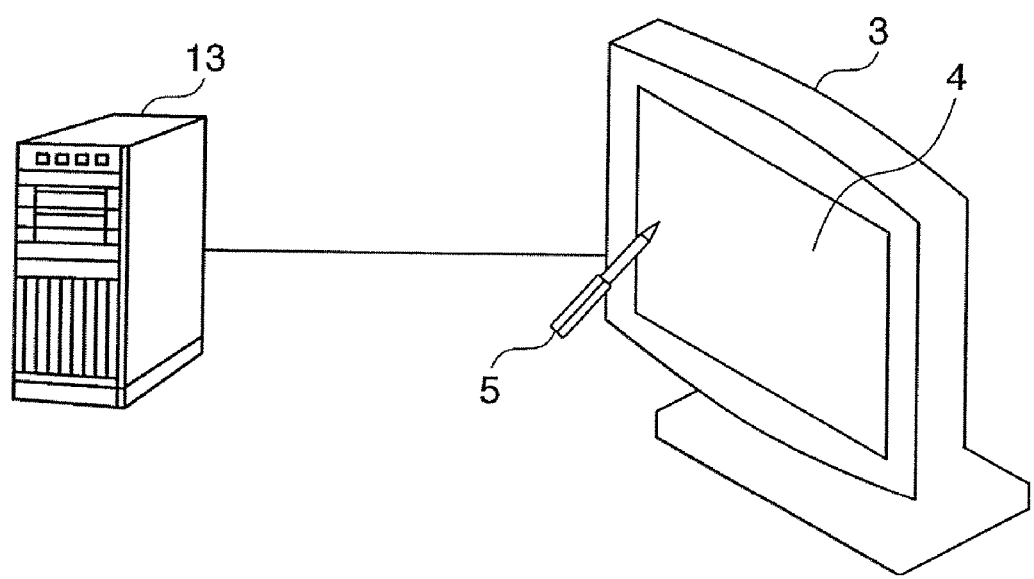
FIG. 11 depicts a view schematically illustrating the configuration of a display system according to the third embodiment.

FIG. 11 depicts a view schematically illustrating the configuration of a display system according to a third embodiment of the present invention.

A server 13 stores documents and data files, etc., used in a conference. A document or data file that has been read in from the server 13 is sent to and displayed on the large-screen display apparatus 3 via a network such as a LAN. The user is capable of designating a position on the screen of the display apparatus 3 by means of the input pen 5. As a result, a document or data file capable of being edited can be annotated using the optical digitizer 4.

Figure 12:
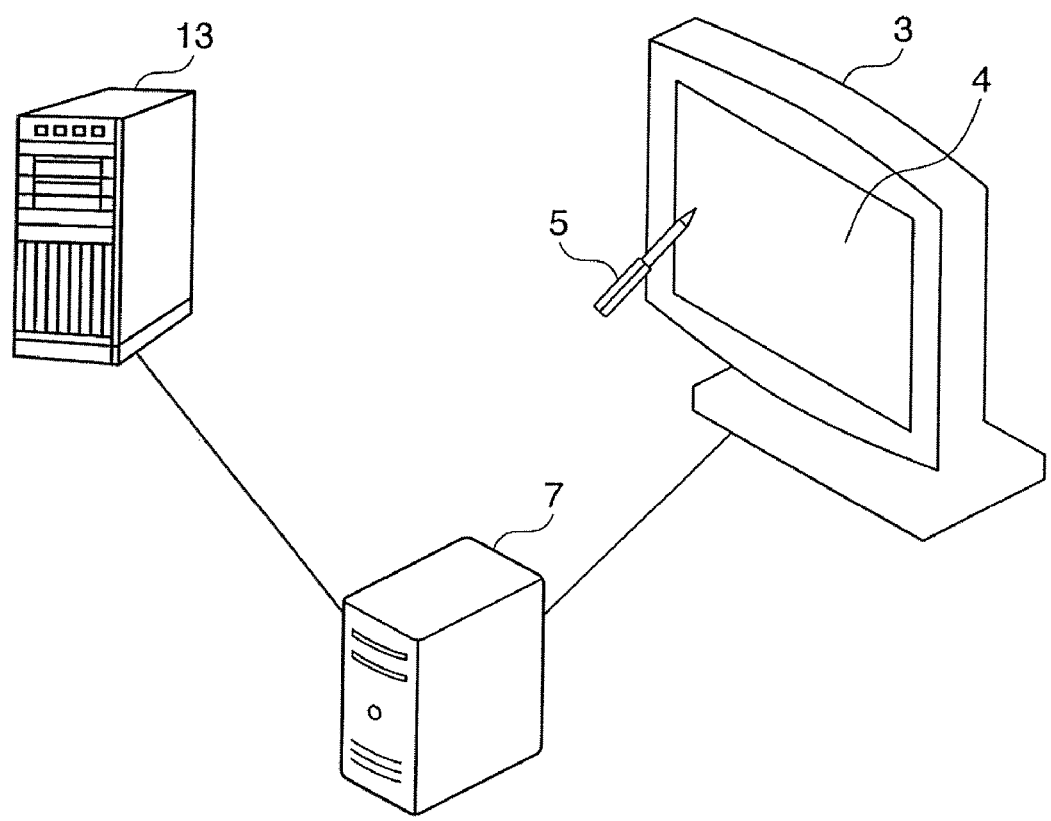
FIG. 12 depicts a view schematically illustrating another configuration of a display system according to the third embodiment.

FIG. 12 depicts a view schematically illustrating another configuration of a display system according to the third embodiment. Here components similar to those in FIG. 11 are designated by like reference characters.

As shown in FIG. 12, the server 13 and the display apparatus 3 are connected via the terminal apparatus 7. In accordance with this configuration, a document or data file that has been read in from the server 13 is sent to and displayed on the display apparatus 3 via the terminal apparatus 7. If a position on the screen of the display apparatus 3 is designated by the optical digitizer 4, coordinate information indicative of the position designated is sent to and processed by the terminal apparatus 7. As a result, a document or file capable of being edited can be annotated using the input pen 5 in a manner similar to that of FIG. 11. The display apparatus 3 in FIG. 11 has the function of the terminal apparatus 7.

Figure 13:
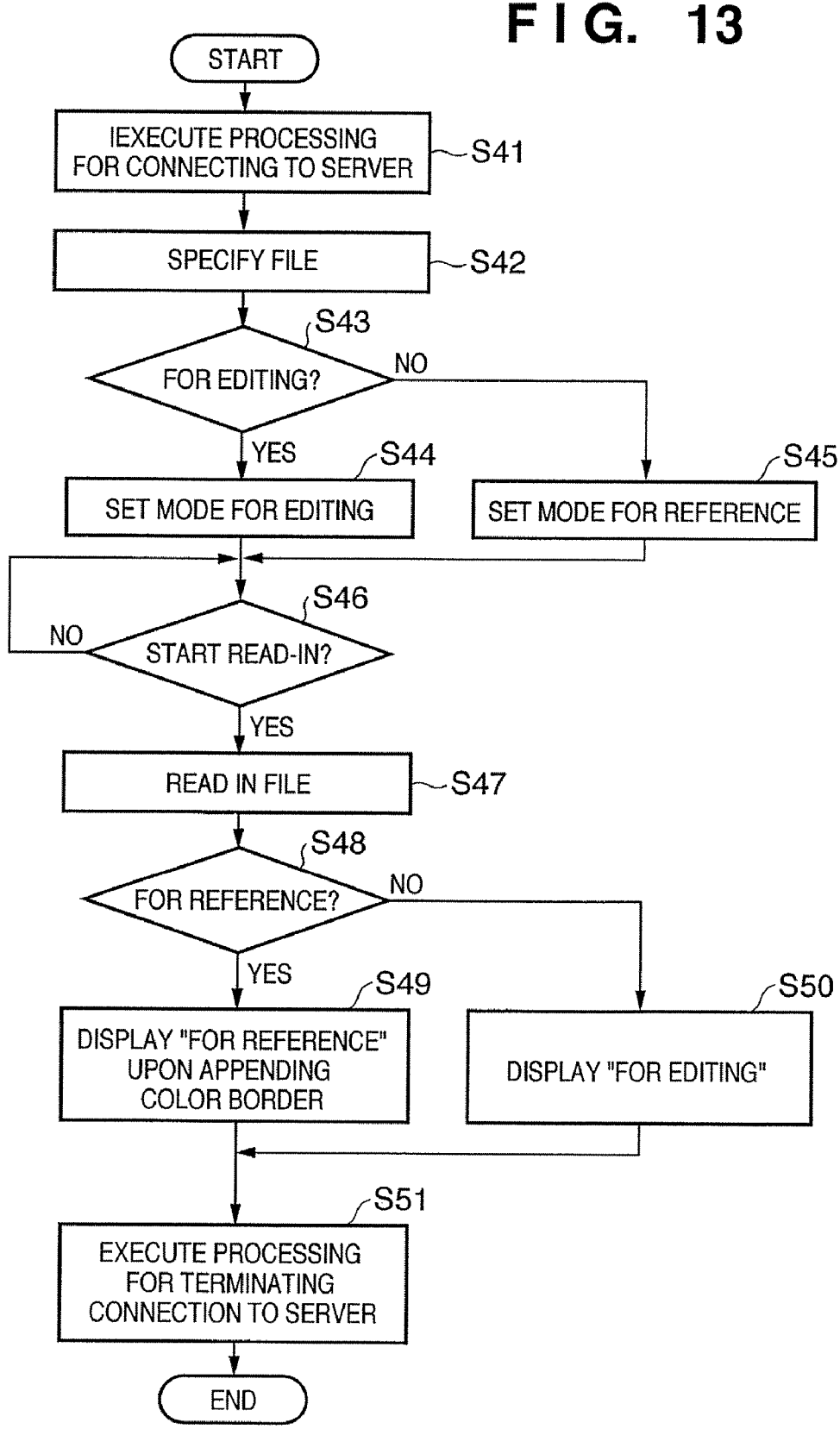
FIG. 13 is a flowchart useful in describing processing in a case where a document or data file is read in from a server in the display apparatus according to the third embodiment.

FIG. 13 is a flowchart useful in describing processing in a case where a document or data file is read in from the server 13 in the third embodiment.

First, processing for connecting to the server 13 is executed at step S41. Here initialization processing known heretofore is executed and a list of files stored in the server 13 as well as a button for selecting "FOR REFERENCE" and "FOR EDITING" are displayed on the screen of the display apparatus 3. The selection button is a software button for selecting whether to establish the edit mode or the reference mode with regard to a document or data file that will be read in. The edit mode allows the document or file to be subjected to editing such as addition or deletion. In the reference mode, editing such as addition or deletion is inhibited from being applied to the document or file. The selection button may be buttons selectable with regard to respective ones of the edit and reference modes, or a button for alternatively changing over the mode whenever the button is clicked.

Next, at step S42, a file to be read in is selected from the list of files that are being displayed on the screen of the display apparatus 3 and that have been stored in the server 13.

Next, at step S43, an input from the mode selection button when a display is presented on the display apparatus 3 is accepted and control proceeds to step S44 if the edit mode has been specified. The edit mode is set in correspondence with the selected file and is stored in the RAM 312 of the display apparatus 3 at step S44. Control then proceeds to step S46. If the reference mode is specified in step S43, on the other hand, control proceeds to step S45. Here the reference mode is set in correspondence with the selected file and is stored in the RAM 312 of the display apparatus 3. Control then proceeds to step S46. Here an input from a file-read start button is accepted. If start of read-in is specified, control proceeds to step S47 and the specified file is read in from the server 13.

Next, at step S48, it is determined whether the mode information that has been stored in the RAM 312 in correspondence with the read file is indicative of the reference mode or edit mode. If the mode is the reference mode, control proceeds to step S49. Here the image is displayed upon the addition of a color different from that "FOR EDITING" to a title bar in an area that displays the image, as indicated by window 72 in FIG. 7, so as to make "FOR REFERENCE" identifiable.

The example of the display screen of the display apparatus 3 in the second embodiment is the same as that shown in FIG. 7. The arrangement of FIG. 7 is similar to that of the first embodiment and need not be described again.

Image data displayed in the display area 72 that displays an image in the reference mode is inhibited from undergoing editing such as annotation. When the display area 72 has been activated, the display area 71 and the editing menu window 73 are deactivated and all editing items become incapable of being selected. Further, storage of the image as conference materials also is inhibited. Conversely, editing such as annotation is capable of being applied to image data displayed in the display area 71 that displays an image in the edit mode. When the display area 71 has been activated, the editing menu window 73 is activated an all editing items become selectable.

This is followed by step S51, at which end of display of the image data is reported to the server 13.

If it is determined at step S48 that the image data read in is of the edit mode, then control proceeds to step S50, where the image data is displayed in the display area 71 shown in FIG. 7. Control then proceeds to step S51, at which end of display of the data is reported to the server 13.

Thus, at the moment a document or file is read in from the server 13, "FOR REFERENCE" or "FOR EDITING" is specified with regard to this document or file. Mode information indicative of either "FOR REFERENCE" or "FOR EDITING" stored in correspondence with the document or data obtained by reading in the specified document or file is referred to and is displayed by the display apparatus 3. As a result, if it is desired only to present a display on the display apparatus 3, the reference mode can be established and editing of the document, etc., inhibited. As a result, editing of the document or data will no longer be performed by the presenter mistakenly. Further, it can be so arranged that a document or the like desired only to be presented to the conferees and not desired to be left as conference materials will only be displayed on the display apparatus 3 and not printed.

In accordance with the third embodiment, as described above, when a document or file is read in from the server 13, whether or not the document or data is to be read in upon being placed in editable form can be specified. The display apparatus that has read in this document or data displays editable data and data that is not editable in respective ones of display areas, thereby making it possible to readily discriminate editable data and data that is not editable.

Fourth Embodiment

A fourth embodiment of the present invention will now be described. The hardware structures of the display apparatus 3 and terminal apparatus 7 of the display system according to the fourth embodiment are identical with those of the first embodiment and need not be described again.

Figure 14:
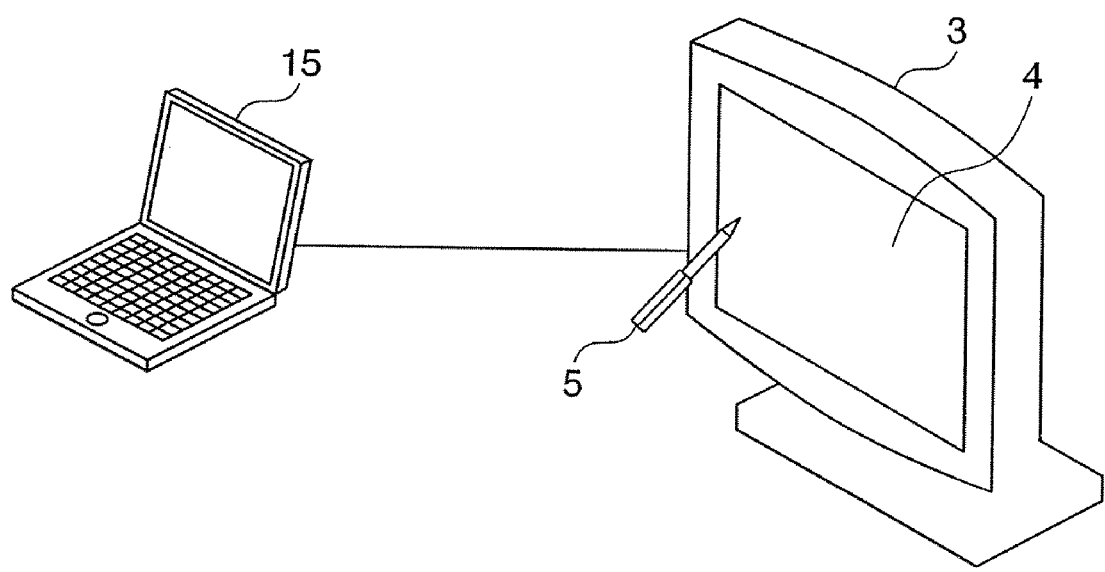
FIG. 14 depicts a view schematically illustrating the configuration of a display system according to the fourth embodiment.

FIG. 14 depicts a view schematically illustrating the configuration of a display system according to a fourth embodiment of the present invention.

A remote personal computer 15 is a notebook personal computer that a conferee has brought to the conference room. The personal computer 15 has its own screen on which documents and data files, etc., used in a conference are displayed. The content of this screen display is transferred to the large-screen display apparatus 3 via a network or the like. The display apparatus 3 displays, in the form of a window, the screen information being displayed on the screen of the remote personal computer 15 received from the personal computer 15. The user is capable of designating a position on the screen of the display apparatus 3 by means of the input pen 5. As a result, the transferred screen information can be annotated using the optical digitizer 4.

FIG. 15 depicts a view schematically illustrating another configuration of a display system according to the fourth embodiment. Here components similar to those in FIG. 14 are designated by like reference characters.

As shown in FIG. 15, the remote personal computer 15 and the display apparatus 3 are connected via the terminal apparatus 7. In accordance with this configuration, the screen information of the remote personal computer 15 transferred from the remote personal computer 15 is sent to and displayed on the display apparatus 3 via the terminal apparatus 7. If a position on the screen of the display apparatus 3 is designated by the optical digitizer 4, coordinate information indicative of the position designated is sent to and processed by the terminal apparatus 7. As a result, an image capable of being edited can be annotated using the input pen 5 in a manner similar to that of FIG. 14. The display apparatus 3 in FIG. 14 has the function of the terminal apparatus 7.

Figure 16:
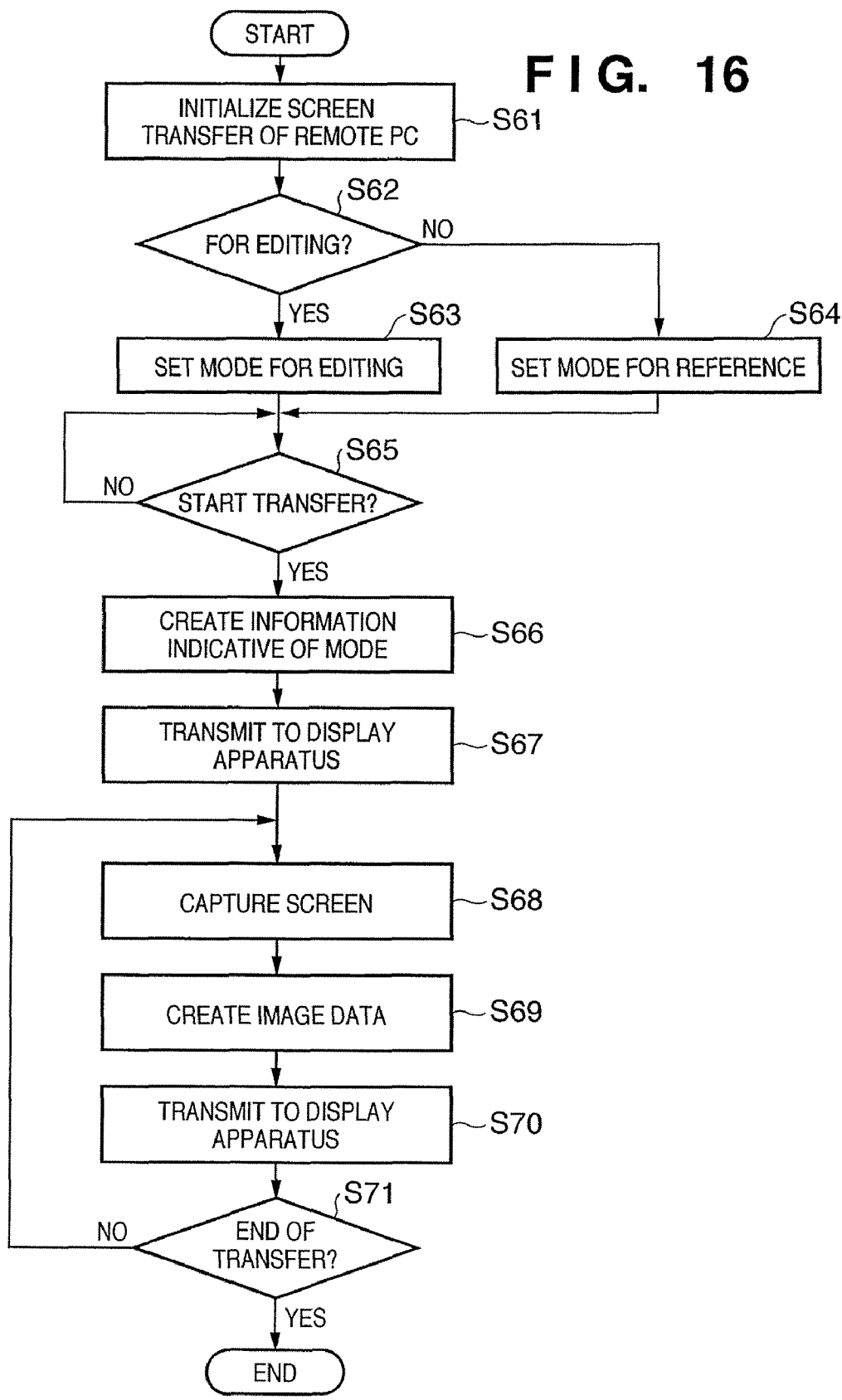
FIG. 16 is a flowchart useful in describing processing in a case where screen information being displayed on the screen of a personal computer is transferred to a display apparatus.

FIG. 16 is a flowchart useful in describing processing in a case where display information being displayed on the screen of the remote personal computer 15 is transferred to the display apparatus 3 in the fourth embodiment.

First, the remote personal computer 15 is initialized. Here initialization processing known heretofore is executed and a button for selecting "FOR REFERENCE" and "FOR EDITING" is displayed on the screen of the remote personal computer 15. The selection button is a software button for selecting whether to establish the edit mode or the reference mode with regard to a document or data file that will be read in. The edit mode allows the document or file to be subjected to editing such as addition or deletion. In the reference mode, editing such as addition or deletion is inhibited from being applied to the document or file. The selection button may be buttons selectable with regard to respective ones of the edit and reference modes, or a button for alternatively changing over the mode whenever the button is clicked.

Next, at step S62, an input from the mode selection button when a display is presented on the display apparatus 3 is accepted and control proceeds to step S63 if the edit mode has been specified. The edit mode is set and the set mode is stored in a memory of the remote personal computer 15 at step S63. Control then proceeds to step S65. If the reference mode is specified in step S62, on the other hand, control proceeds to step S64. Here the reference mode is set and the set mode is stored in the memory of the remote personal computer 15. Control then proceeds to step S65. Here an input from a screen-transfer start button is accepted. If start of screen transfer is specified, control proceeds to step S66, where information indicative of the mode is created. Next, at step S67, mode information indicative of either the reference mode or the edit mode is transferred to the display apparatus 3, after which control proceeds to step S68.

The display screen of the remote personal computer 15 starts being captured at step S68 and the screen information is read. Then, at step S69, image data for display is created based upon the screen information read. At step S70, then the image data is sent to the display apparatus 3. Next, at step S71, it is determined whether a command to end screen transfer has been accepted. If such a command has been accepted, then screen transfer is terminated. If it is determined at step S71 that a command to end screen transfer has not been issued, then control returns to step S68 and the screen transfer is continued.

Figure 17:
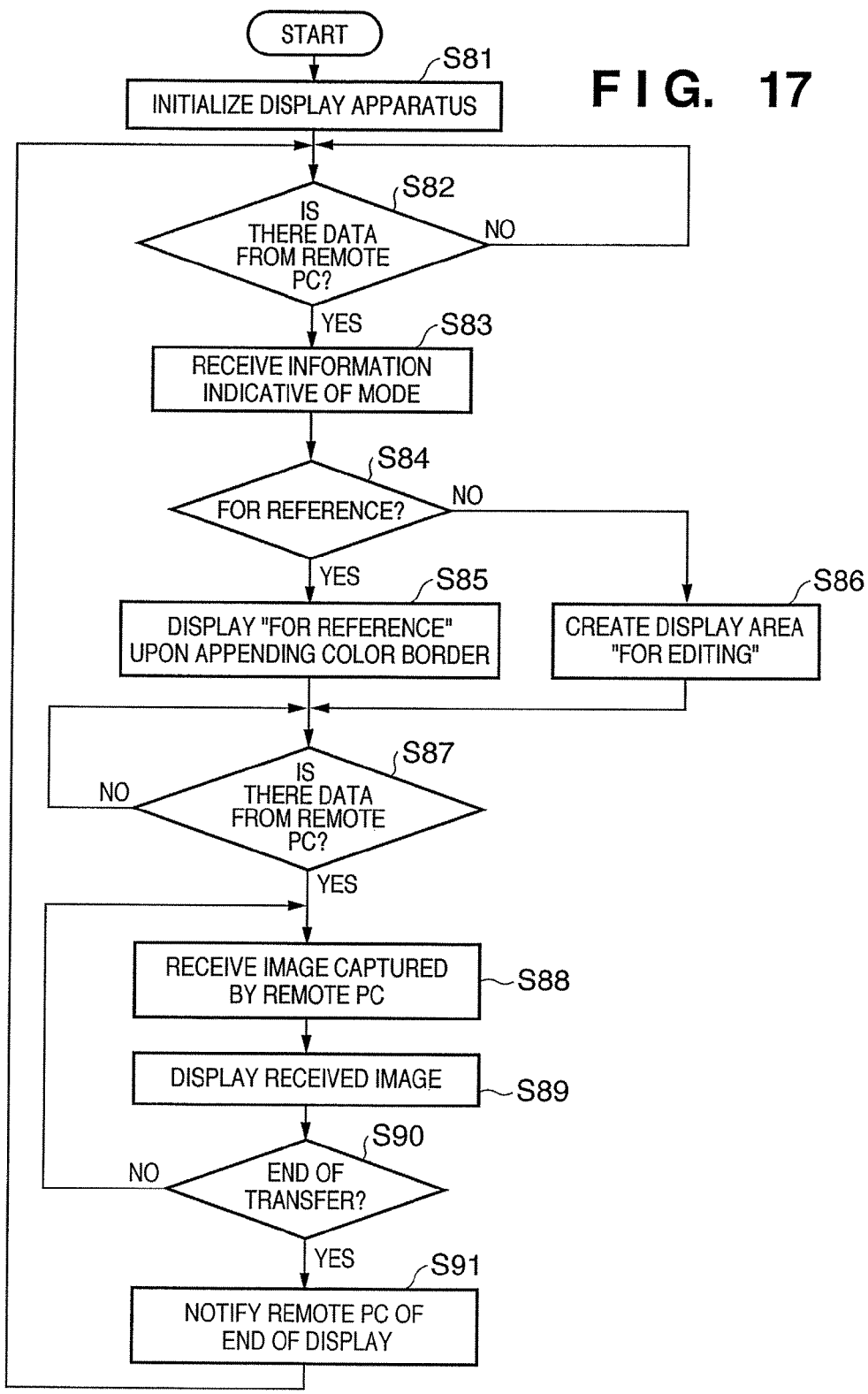
FIG. 17 is a flowchart useful in describing processing in a display apparatus according to the fourth embodiment.

FIG. 17 is a flowchart useful in describing processing in the display apparatus 3 according to the fourth embodiment. This is processing in which information indicative of the reference mode or edit mode and the image data that have been transferred from the remote personal computer 15 are displayed on the display apparatus 3. The program for executing this processing has been stored in the ROM 311 of FIG. 4 and is executed under the control of the CPU 310.

First, initialization of the display apparatus 3 is performed at step S81. Here initialization processing known heretofore is executed and preparations are made for receiving image data from the remote personal computer 15. Next, at step S82, transmission of mode-related information from the remote personal computer 15 is awaited and control proceeds to step S83 when the mode-related information is transmitted from the personal computer 15. The mode-related information is received from the personal computer 15 at step S83. Next, at step S84, it is determined whether the mode-related information received is indicative of the reference mode or edit mode. If the mode is the reference mode, control proceeds to step S85. Here the image is displayed upon the addition of a color different from that "FOR EDITING" to a title bar in an area that displays the image, as indicated by window 72 in FIG. 7, so as to make "FOR REFERENCE" identifiable.

The example of the display screen of the display apparatus 3 in the fourth embodiment is the same as that shown in FIG. 7. The arrangement of FIG. 7 is similar to that of the first embodiment and need not be described again.

Image data displayed in the display area 72 that displays an image in the reference mode is inhibited from undergoing editing such as annotation. When the display area 72 has been activated, the display area 71 and the editing menu window 73 are deactivated and all editing items become incapable of being selected. Further, storage of the image as conference materials also is inhibited. Conversely, editing such as annotation is capable of being applied to image data displayed in the display area 71 that displays an image in the edit mode. When the display area 71 has been activated, the editing menu window 73 is activated and all editing items become selectable.

If it is determined at step S84 that the received image data is of the edit mode, then control proceeds to step S86, where the image data is displayed in the display area 71 shown in FIG. 7. Control then proceeds to step S87. Here transmission of image data from the remote personal computer 15 is awaited and control proceeds to step S88 when image data is transmitted from the personal computer 15. The image data is received from the remote personal computer 15 at step S88. Next, at step S89, the image data received from the remote personal computer 15 is displayed in the display area displayed at step S85 or S86 in accordance with the mode received at step S84. Next, at step S90, it is determined whether transfer of image data from the remote personal computer 15 has ended. If transfer of the image data from the remote personal computer 15 has not ended, control returns to step S88. If it is determined at step S90 that transfer of the image data has ended, then end of display of the image data is reported to the remote personal computer 15 at step S91, control returns to step S82 and the above-described processing is executed.

Thus, at the moment transfer of the screen information starts at the remote personal computer 15, "FOR REFERENCE" or "FOR EDITING" is specified. Data indicative of either "FOR REFERENCE" or "FOR EDITING and image data obtained subsequently is transferred to the display apparatus 3. As a result, if it is desired only to present a display on the display apparatus 3, the reference mode can be established and editing of data such as a document inhibited. This means that there is no longer danger of the presenter editing this data mistakenly. Further, it can be so arranged that a document or the like desired only to be presented to the conferees and not desired to be left as conference materials will only be displayed on the display apparatus 3 and not printed.

In accordance with the fourth embodiment, as described above, whether or not image data is supplied upon being placed in editable form can be specified at the supply source (the remote personal computer 15 in the fourth embodiment) of the image data, and this image data can be supplied to the display apparatus. The display apparatus 3 that has received this image data displays editable image data and image data that is not editable in respective ones of display areas, thereby making it possible to readily discriminate editable image data and image data that is not editable.

It should be noted that the fourth embodiment is such that when the display screen of the personal computer 15 is transferred, the display screen is captured and the image data thereof transferred. However, a draw command may be transferred from the remote personal computer 15 and an image based upon this draw command may be rendered on the side of the display apparatus 3 or host personal computer.

Fifth Embodiment

A fifth embodiment of the present invention will be described next. It should be noted that the hardware configurations of the multifunction peripheral 1, display apparatus 3 and terminal apparatus 7 in the display system according to the fifth embodiment are identical with those of the first embodiment and need not be described again. The fifth embodiment assumes that the content of a display screen being displayed on the display apparatus 3 is loaded and either stored or printed. (Here screen capture is a function for loading the display data per se being displayed on the display screen of the display apparatus 3). A characterizing feature of the fifth embodiment is that if an image is being displayed in the reference mode, storage or print processing is executed in a form in which the image being displayed in the reference mode disappears (is erased) on the screen of the display apparatus 3. As a result, it is so arranged that an image being displayed in the reference mode will not be stored or printed.

Figure 18:
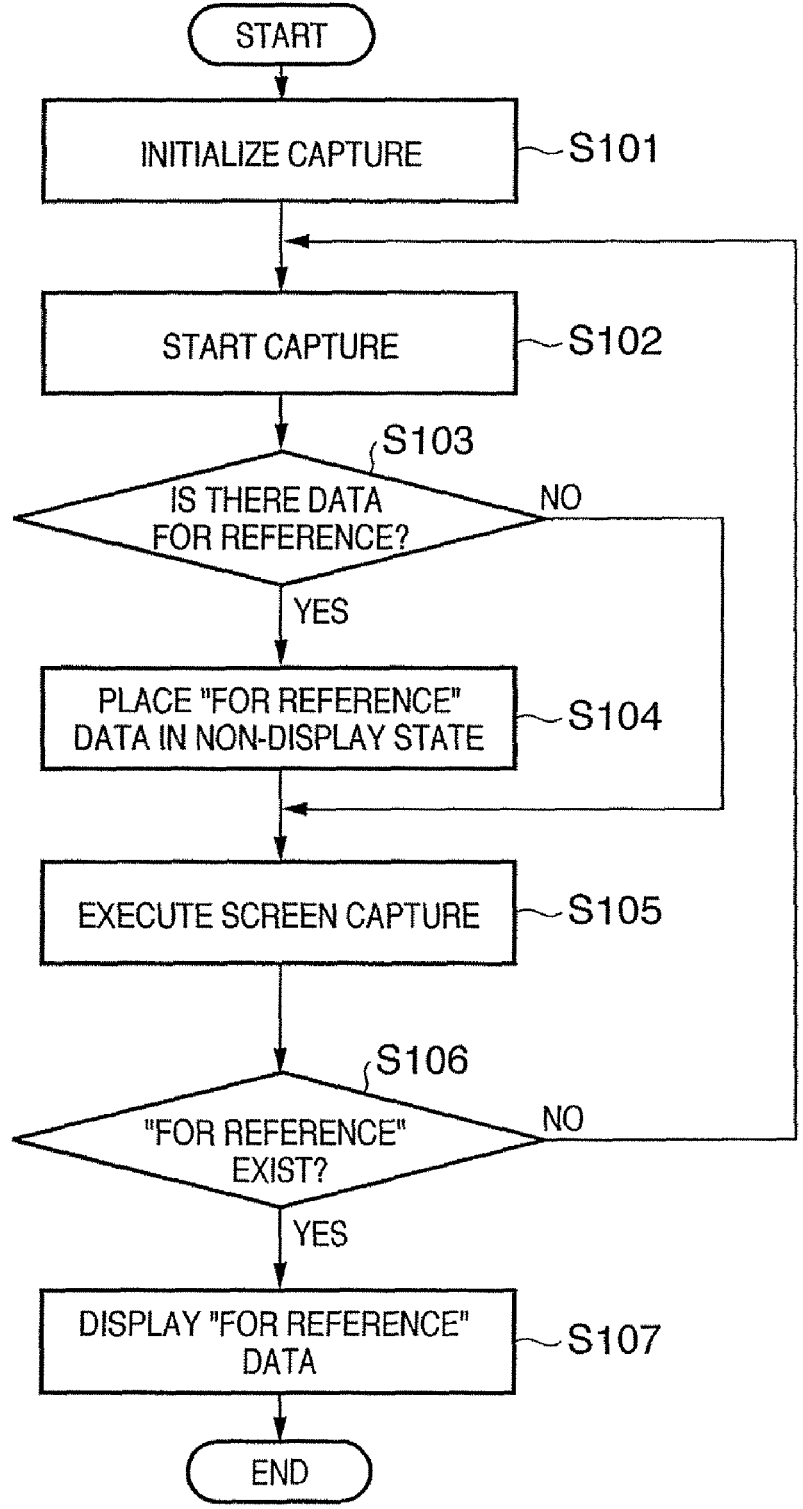
FIG. 18 is a flowchart illustrating processing by a display apparatus in a display system according to the fifth embodiment.

FIG. 18 is a flowchart illustrating processing by the display apparatus 3 in a display system according to the fifth embodiment. The program for executing this processing has been stored in the ROM 311 and is executed under the control of the CPU 310.

Figure 19:
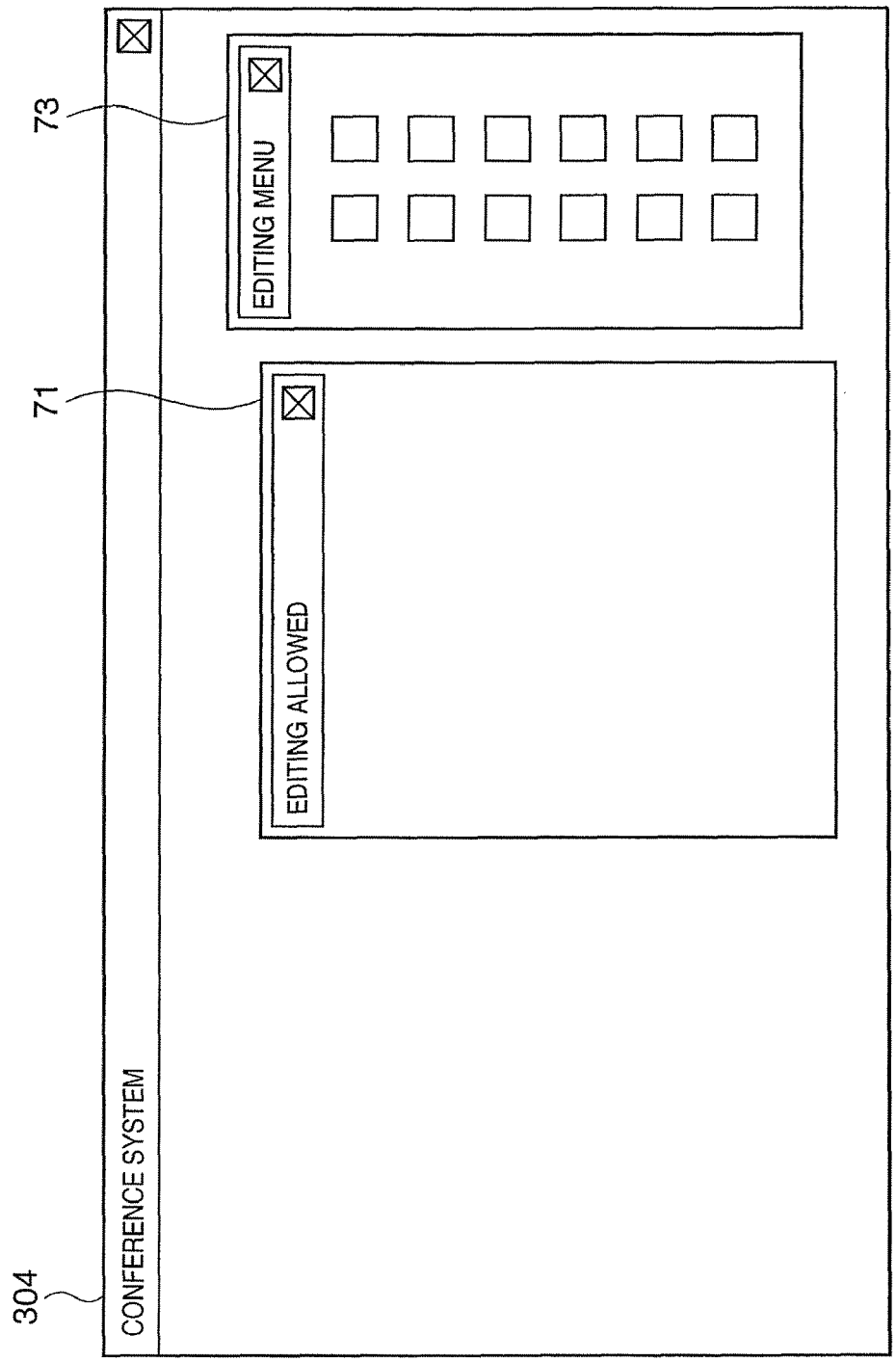
FIG. 19 depicts a view illustrating a state in which display of image data "FOR REFERENCE" has been erased from the display state of FIG. 7 in the fifth embodiment.

First, at step S101, the screen capture function of the display screen of display apparatus 3 is initialized. Here initialization processing of an application known heretofore is executed. Next, at step S102, screen-capture processing is started when screen capture is specified by the user. This is followed by step S103, at which it is determined whether "FOR REFERENCE" data is being displayed, i.e., whether an image is being displayed in the display area 72, at this time. If the result of the determination is that the display area 72 of the image data "FOR REFERENCE" in FIG. 7 is being displayed, then control proceeds to step S104. Here the display area 72 is placed in the non-display state (erased), as illustrated in FIG. 19, and control proceeds to step S15. On the other hand, if it is determined at step S103 that the image data is not image date "FOR REFERENCE", control proceeds to step S105.

FIG. 19 depicts a view illustrating a state in which display of image data "FOR REFERENCE" has been erased from the display state of FIG. 7.

Next, at step S105, screen capture is executed. When screen capture ends, control proceeds to step S106, at which it is determined whether data "FOR REFERENCE" in the non-display state exists or not. If data "FOR REFERENCE" in the non-display state does not exist, control returns to step S102. If data "FOR REFERENCE" in the non-display state does exist, however, control proceeds to step S107. Here the display area 72 of the data "FOR REFERENCE", which was placed in the non-display state at step S104, is displayed again, after which control returns to step S102 to wait for a screen-capture command from the user.

Thus, even if the system is one in which content being displayed on the display apparatus 3 can be stored or printed, image data or document data displayed as being "FOR REFERENCE" is merely displayed on the display apparatus 3 and will not be stored as, e.g., conference materials. As a result, an increase in copies of data set up for referential purposes can be prevented.

In the first and fourth embodiments of the present invention set forth above, a case where image data is transferred directly from the image supply apparatus to the display apparatus 3 is described, as in FIG. 1 and FIG. 14. However, it may be so arranged that a conference system is constructed via the terminal apparatus 7, as depicted in FIGS. 2 and 15. Further, in the examples of FIGS. 2 and 15, the terminal apparatus 7 may have the "FOR REFERENCE" and "FOR EDITING" mode setting function of the above-described image supply apparatus and the display control function of the display apparatus 3. In such case the image supply source and the display apparatus 3 may be image supply apparatus and display apparatus well known in the prior art.

Further, although it has been described that a cable such as a USB cable is used in connecting the image supply apparatus and display apparatus or terminal apparatus, a wireless or wired network may be used.

Further, although an optical digitizer has been illustrated as an example of a pointing device, the invention is not limited to an optical digitizer.

Further, although it is assumed that the display apparatus 3 is large-screen display apparatus, the display apparatus is not limited to that of the large-screen type.

Further, in the foregoing embodiments, it is so arranged that either the mode "FOR EDITING" or the mode "FOR REFERENCE" is set by the image supply apparatus that supplies image data. However, the invention is not limited to this arrangement and the modes may be set by the display apparatus or terminal apparatus described above.

It should be noted that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

Examples of storage media for supplying the program code in the second embodiment are a Floppy (registered trademark) disk, hard disk, magneto-optical disk, CD-ROM, CD-R, CD-RW, DVD-ROM, DVD-RAM, DVD-R, DVD+R, DVD-RW, DVD+RW, HD-DVD, Blu-ray Disc, magnetic tape, non-volatile memory card and ROM, etc. Further, the program code may be downloaded via a network.

Furthermore, besides the case where the aforesaid functions according to the embodiments are implemented by executing the program codes read by a computer, it goes without saying that the present invention covers a case where an operating system or the like running on the computer performs a part of or the entire process based upon the designation of program codes and implements the functions according to the embodiments.

It goes without saying that the present invention further covers a case where, after the program codes read from the storage medium are written in memory provided on a function expansion board inserted into the computer or in a memory provided in a function expansion unit connected to the computer, a CPU or the like contained in the function expansion board or function expansion unit performs a part of or the entire process based upon the designation of program codes and implements the function of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-253797, filed Sep. 1, 2005, and Japanese Patent Application No. 2006-210254, filed Aug. 1, 2006, which are hereby incorporated by reference herein in their entirety.

What is claimed is:

1. A display system for displaying an image on a display device based upon image data supplied from an image supply device;

wherein the image supply device comprises:
a scanner unit configured to read an original to acquire image data of the original;
an input unit configured to input the image data acquired by the scanner unit to the display device; and
a designation unit configured to accept a designation, prior to scanning of the original by scanner unit, as to whether the image data is allowed or not to be stored or printed while the display device is displaying an image of the image data; and wherein the display device comprises:
a display control unit configured to display an image of image data if the image data is allowed to be stored or printed in a first display area of a screen and display an image of image data if the image data is not allowed to be stored or printed in a second display area being different from the first display area of the screen; and
a control unit configured to control of storing or printing of the displayed image data of the displayed image in accordance with the designation accepted by the designation unit.

2. The system according to claim 1, wherein the display control unit further displays a menu window on a screen, which displays an editing menu of an image data of the image, in a case that the image is allowed to be stored or printed.

3. The system according to claim 1, the display device further comprising:
a determination unit, in a case that printing of an image being displayed on the screen has been designated, configured to determine whether or not the image includes image data which is not allowed to be stored or printed; and
a printing control unit, in a case that the determination unit has determined that the image includes the mage data which is not allowed to be stored or printed, configured to print the image, in a state in which the image data which is not allowed to be stored or printed has been erased from image data of the image.

4. The system according to claim 3, the display device further comprising a unit configured to restore and display the image data which is not allowed to be stored or printed after printing is performed by the printing control unit.

5. A display control method for displaying an image on a display device based upon image data supplied from an image supply device, said method comprising:
a scanning step of scanning an original to acquire image data of the original;
a designation step of accepting a designation, prior to the scanning step, as to whether the image data is allowed or not to be stored or printed while the display device is displaying an image of the image data; and
a display control step of displaying an image of the image data if the image data is allowed to be stored or printed in a first display area of a screen and displaying an image of the image data if the image data is not allowed to be stored or printed in a second display area being different from the first display area of the screen; and
a control step of controlling of storing or printing of the image data of the displayed image in accordance with the designation accepted in the designation step.

6. The method according to claim 5, wherein the display control step further displays a menu window on the screen, which displays an editing menu of an image, in a case that image data of the image is allowed to be stored or printed.

7. The method according to claim 5, further comprising:

a determination step of determining whether or not an image includes image data which is not allowed to be stored or printed, when printing of the image being displayed on the screen has been designated; and a printing control step of printing the image, in a state in which the image data which is not allowed to be stored or printed has been erased from image data of the image, in a case that it has been determined in the determination step that the image includes the image data which is not allowed to be stored or printed.

* * * * *